…

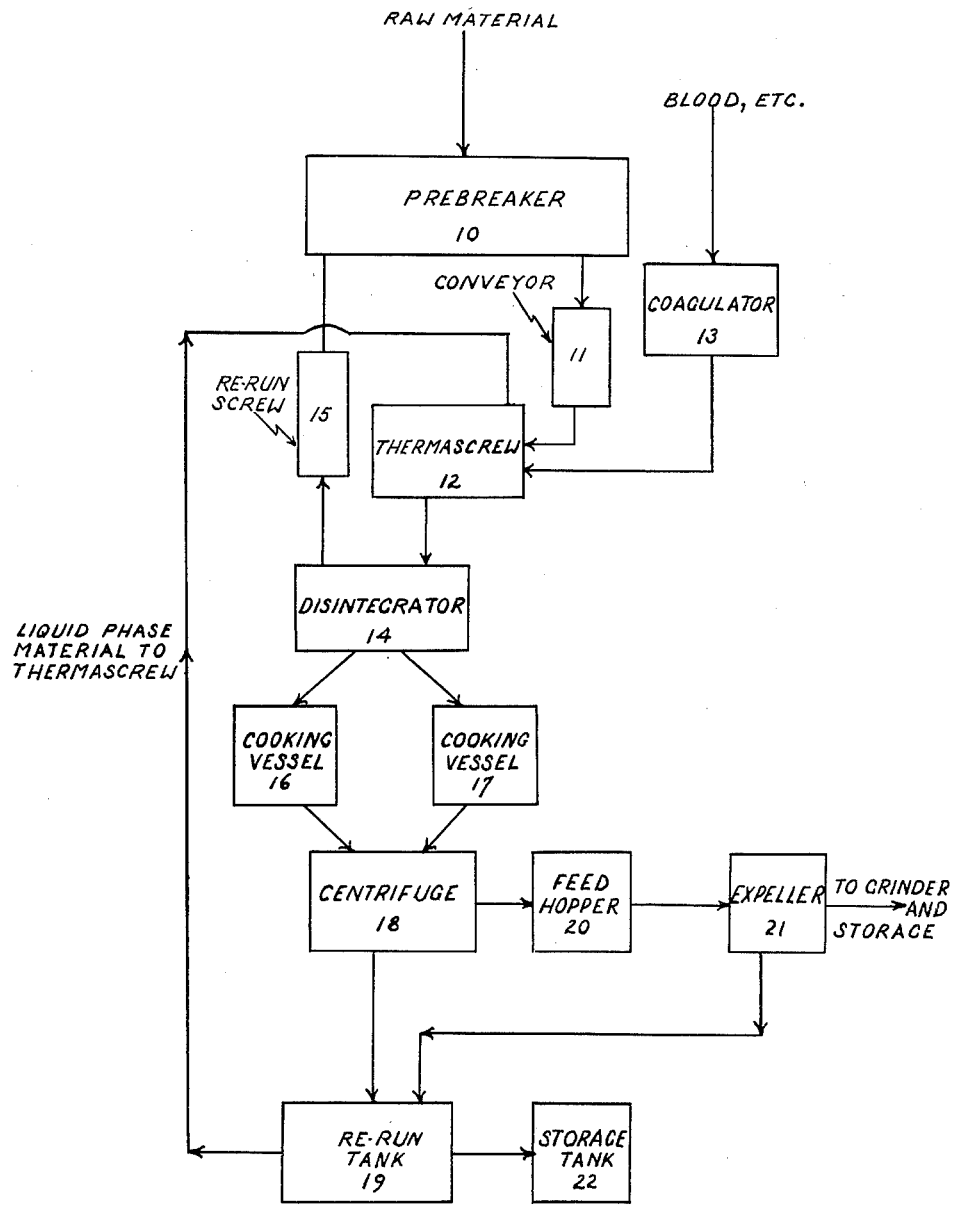

United States Patent Office 3,046,286
Patented July 24, 1962

3,046,286
PROCESS FOR RECOVERING FATS AND MEAT AND BONE SCRAP FROM INEDIBLE SLAUGHTERHOUSE MATERIALS
Paul Speer, La Grange, Ill., Charles Griggs, Mason City, Iowa, and Daniel J. McAvoy, Downers Grove, Ill., assignors, by mesne assignments, to Armour and Company, Chicago, Ill., a corporation of Delaware
Filed Feb. 6, 1959, Ser. No. 791,743
4 Claims. (Cl. 260—412.6)

This invention relates to a process for obtaining valuable residual products from animal wastes. More particularly this invention relates to a continuous process for recovering protein in the form of fats and meat and bone scrap from inedible slaughterhouse materials.

The recovery of by-products from animal wastes has long presented serious economic and technical problems to the meat packing industry. For this reason there has been considerable research and experimental work devoted to the development of processes that will yield high quality products in the least amount of time with the most economical equipment.

The difficulties encountered in this phase of the meat packing industry stem primarily from the nature of the starting materials. These usually include bones, vascular substances such as blood, whole carcasses of condemned animals, heads, hooved feet, scrap fat, condemned and regular offal, and numerous other non-edible substances. In order to recover by-products in saleable form from such materials specialized processing procedures are required. Meat and bone scrap, for example, must be recovered under conditions that will render it low in fat and moisture content. The fats obtained from such materials, on the other hand, must be recovered under conditions that will render them substantially free of both moisture and solids. Moreover, each of these by-products must be treated at some stage during the processing to rid them of any harmful or deleterious agents.

Heretofore inedible slaughterhouse materials were treated in one of two basic ways. The most commonly used method is wet rendering which normally takes from 24 to 48 hours to complete. Briefly, this method involves passing the cleaned raw materials from the slaughtering area through grinding machines. The ground material is then transferred into a tank where open live steam is applied for a period of from 4 to 8 hours. Following this operation the stlurry thus formed is allowed to settle. This phase of the procedure again takes from 4 to 8 hours. After settling, several layers are formed in the settling tank which are separated by decantation.

The top layer which contains the oil is pumped to a tank where it is dried. Generally this is an overnight operation which has a deteriorating affect on the oil due to the fact that some carbonization occurs. The dried oil is then pumped to storage for ultimate use.

The soluble proteins layer from the settling tank is evaporated to remove a large portion of the water, after which it is mixed with the tankage and dried by means of horizontal steam driers. The product thus obtained is referred to as "digestor tankage," and is employed as a high protein supplement in animal feeds.

The second most widely used method for treating inedible slaughterhouse materials is dry rendering. Again, briefly, this process involves passing pre-cleaned raw materials through hashers. The smaller bones and other solid portions are reduced in size by rough crushers. These materials are then introduced into horizontal steam agitated cookers for a period of from 4 to 12 hours. The slurry thus formed is then dropped into a percolator pan from which the fats and fine cracklings drain away from the solids into primary settling tanks. Settling usually requires from 4 to 8 hours after which the fats are siphoned off to storage. The fine cracklings from the primary settling tanks are recirculated through the system. The solid particles or cracklings remaining in the percolator pan are transferred to an expeller where the residual fats are pressed from the cracklings and pumped to the pimary settling tanks. The cracklings from the expeller are conveyed to the animal feed section where they are ground, bagged and sold as a high protein supplement for animal feeds.

The raw blood or vascular substances from the slaughterhouse operation requires separate facilities for handling. This material is generally collected from the killing area and pumped either to a dryer or to a storage tank. If it is pumped directly to a dryer the blood is heated for about 12 hours to drive off the moisture and to denaturize it. The dried and coagulated blood is then transferred to the animal feed department and mixed with the digestor tankage or cracklings for ultimate use.

Each of the foregoing methods of handling and treating inedible slaughterhouse materials requires prolonged periods of time to complete and involves the use of cumbersome, space-filling equipment requiring constant cleaning and maintenance. Moreover, these coventional methods cannot cope with materials such as large bones. Thus yields of by-products are reduced.

We have discovered a continuous process for obtaining by-products of excellent quality in high yields from inedible slaughterhouse materials which substantially eliminates the disadvantages in time, labor, space, and cost of equipment encountered with conventional processes, and which is capable of handling substantially all types of materials including large bones.

It is, therefore, the principal object of this invention ot provide a continuous process for obtaining by-products of higher quality in higher yields from inedible slaughterhouse materials, including all types of solid portions of said materials.

It is another object of this invention to provide a continuous process for obtaining by-products from inedible slaughterhouse materials, including vascular substances, which substantially eliminates the need for sepaarte handling, treating and storage facilities for the vascular substances.

It is still another object of this invention to provide a process for obtaining by-products such as fats, and meat and bone scrap from inedible slaughterhouse materials which materially reduces processing time and production costs, and which can be performed in far less space than required by conventional methods.

Additional objects and advantages of this invention will become apparent as the following description proceeds, taken in conjunction with the accompanying drawing and the following description and claims.

The drawing is a schematic illustration of the various steps involved in the processing of inedible slaughterhouse materials according to this invention.

Briefly, this invention involves reducing or particlizing substantially all solid portions of inedible slaughterhouse materials, heating the reduced materials to lower the moisture content thereof and to improve the disintegration characteristics of the materials, further reducing or particlizing the solid portions of the materials to a pre- determined particle size, again heating the materials to rupture the fat cells, to further reduce the moisture content, and to render the material substantially free from deleterious or harmful agents, centrifugally separating and recovering the solid and liquid phases of the materials, and, finally, removing residual liquid phase materials from the solid phase.

In another important aspect of this invention, vascular substances including raw blood may be incorporated into the reduced or particlized portions of the inedible slaughterhouse materials preferably prior to the first heating step hereinabove mentioned. The vascular substances may be introduced as they are received from the killing area. However, it is preferred that they be partially coagulated or denaturized before being mixed with the reduced materials. This preferred mixture is then treated as described above, with the second heating step serving, in addition to the stated functions, to complete coagulation or denaturization of the vascular substances.

In the preferred embodiment of the system, as schematically illustrated in the drawing, for carrying out the steps of this invention, the raw materials from the slaughtering area are directed to a grinding machine 10 for initial reduction in size. Any suitable grinding apparatus may be employed to achieve this end. The preferred apparatus is a Rietz prebreaker, the size and capacity of which will depend on the magnitude of the slaughtering operation. Other suitable apparatus for this purpose are sold under the trade names Diamond Hog and Mitts & Merrill. The preferred apparatus is satisfactory for accomplishing the reduction or particlization of substantially all types of materials coming from the killing area and is capable of handling whole carcasses.

The grinding machine or prebreaker 10 is preferably connected to a conveying apparatus such as a screw elevator 11 which removes material from the prebreaker at a substantially uniform rate and directs it to the initial heating stage. The initial heating of the materials is preferably achieved by means of a thermascrew 12 provided with a jacket which may be heated to a suitable temperature either by steam or gas. The thermascrew, in addition, is preferably provided with a steam or gas heated flight which is maintained at a suitably higher temperature than that of the jacket. The length of the thermascrew 12 may vary in length from 5 to 15 or more feet depending, again, on the quantity of material handled. Examples of apparatus having use for the purposes of this invention are Rietz T-J 12-15 and Holo-Flite thermascrews.

The temperature achieved in the thermascrew is preferably between about 100° to 212° F. This preferred temperature range serves to lower to some extent the moisture content of the materials conveyed through it. The extent of this moisture reduction is, of course, dependent on the temperature used and the amount of surface area available for contact with the materials. Moisture losses of from about 5% to about 10% have been achieved.

The thermascrew 12 preferably communicates with a steam heated coagulator 13, adapted to receive and partially denaturize or coagulate vascular substances such as raw blood coming from the killing area. The coagulator 13 channels the semisolid vascular substances directly into the thermascrew 12 where they are mixed with the materials coming from the grinding machine or prebreaker 10. This method of handling the vascular substances to a large degree eliminates conventional cumbersome and space filling equipment used for this purpose. What is more, it has been discovered that fats, and meat and bone scrap obtained in accordance with this practice of our invention are of excellent quality, there being no downgrading of the by-products, the fats in particular. The meat and bone scrap, moreover, is a homogeneous mixture requiring no further mixing as with conventional methods.

Upon completion of the run through the thermascrew 12, the materials are conveyed to a disintegrator 14, preferably operated by a motor direct-coupled drive, where the solid portions of the materials are further reduced in size to produce a homogeneous slurry. An example of equivalent finding use for this purpose is a Rietz disintegrator which may be provided with a 100 to 125 horsepower motor, and operated at a speed of approximately 3450 revolutions per minute. The importance in reducing the particle size with such apparatus is related to the fact that the fat which is mechanically held in the inedible materials is made more readily accessible in subsequent operations. The particle size achieved in the disintegrator 14 is preferably about ½ inch or less. The large sized material that does not pass through the disintegrator may be conveyed by a rerun screw 15 to the prebreaker 10 for further processing.

The homogeneous slurry formed in the disintegrator 14 is preferably directed alternately to dehydrators or cooking vessels 16 and 17 by means of a two-way valve provided for the disintegrator 14. By way of example, the slurry from the disintegrator is allowed to flow into the cooking vessel 16 until capacity has been reached. This may be indicated by an automatic alarm system and the two-way valve of the disintegrator is then adjusted to channel the slurry into reserve cooking vessel 17. While the vessel 17 is filling, the material in vessel 16 is heated with agitation for about 40 minutes, the length of time being dependent on the effectiveness of the heating system, until a sterilization temperature above the boiling point of water is reached. The preferred temperature is in the range of from about 220° to about 270° F. While in the cooking vessel the material is dehydrated, and cell breakdown or rupture, releasing the fats, is accomplished. In addition, deleterious or harmful agents in the materials are destroyed. When the desired temperature has been reached in vessel 16 the heating system is automatically shut off and the homogeneous slurry in vessel 17 is then heated. This cycle is repeated for subsequent runs. The material from vessel 16 is transferred either by gravity or, preferably, by means of centrifugal pumps to a centrifuge 18. The use of centrifugal pumps for this purpose is heretofore unknown. The use of this type of equipment is made possible by the special treating conditions of the materials hereinabove described and represents a considerable advance in the art.

Any suitable centrifuge may be employed. In actual practice it is advantageous to use a continuous solid discharge, solid bowl centrifuge. Models of this preferred apparatus are sold under the trade names Bird, Sharples and DeLaval. The entire contents, preferably under continuous agitation, of the vessel 16 are emptied into the centrifuge 18. The liquid phase effluent from the centrifuge flows by gravity to a rerun tank 19 where it is held for recentrifuging through the centrifuge 18.

The solids or cracklings from the centrifuge are preferably discharged into an expeller feed hopper 20 where by gravity or mechanical means they are directed to an expeller 21. These residual fats are removed from the cracklings, the dried solid phase materials or cracklings being transferred to a conveyor for transport to the animal feed department where it is ground and packaged, and the liquid phase materials being pumped to the rerun tank 19 to be mingled with the liquid extracted by the centrifuge 18. The rerun tank is preferably of sufficient capacity to hold the liquid phase material obtained from full day's run. The rerun operation thus need only be conducted at the end of the day if this proves necessary. Upon redirecting the liquid phase material from rerun tank 19 through the centrifuge 18, the clear fats derived therefrom are preferably transferred to a pump-out tank 22 from where it is conveyed to storage for ultimate use.

Liquid phase material from the rerun tank may be channeled into the thermascrew 12 to aid heat transfer for the initial heating of the raw materials. This operation has proven to be highly beneficial to the quality of the finished products.

The operation as described hereinabove takes place in a completely closed system and therefore overcomes the problems resulting from spillage, overflow and floor mess encountered in conventional operations for treating inedible slaughterhouse materials. Moreover, due to the fact that our process is carried out in a closed system, objectionable odors are largely eliminated. In addition, loss of valuable materials previously caused by delays in processing are avoided.

The process produces fats, and meat and bone scrap that satisfy all commercial standards. The fats are clear and of high quality. The meat and bone scrap is homogeneous and uniform of texture, and like the fats is of high quality.

While in the foregoing description reference has been made to certain types of equipment, particularly with reference to the type of prebreaker, thermascrew, and centrifuge, it is to be understood that any other type of equipment, suitable for the purpose, may be employed or substituted.

Numerous changes and modifications may be made in connection with the various operating conditions and apparatus as herein described within the broad principles of the invention which are intended to be covered by the appended claims. Accordingly, it is understood that the above particular descriptions is by way of illustration and not of limitation, and that changes, omissions, additions, substitution and/or modifications may be made without departing from the spirit of the invention.

We claim:

1. A continuous process for obtaining fats, and meat and bone scrap from inedible slaughterhouse materials comprising reducing substantially all solid portions including bones of said materials, introducing vascular portions of said materials to said reduced portions, heating the mixture thus formed at a temperature of from between 100° to 212° F. to denaturize said vascular portions and to lower the moisture content of said mixture, reducing further said solid portions in said materials to a predetermined particle size, heating the materials at a temperature of from about 220° to about 270° F. to rupture the fat cells, to further reduce the moisture content, and to render the material substantially free from deleterious agents, and centrifugally separating and recovering the solid and liquid phases of said materials.

2. A continuous process for obtaining fats, and meat and bone scrap from inedible slaughterhouse materials comprising reducing substantially all solid portions including bones of said materials, introducing vascular portions of said materials to said reduced portions, heating the mixture thus formed to denaturize said vascular portions and to lower the moisture content of said mixture, reducing further said solid portions in said mixture to a predetermined particle size, heating the mixture to rupture the fat cells, to further reduce the moisture content, and to render the materials substantially free from deleterious agents, and centrifugally separating and recovering the solid and liquid phases of said mixture.

3. A continuous process for obtaining fats, and meat and bone scrap from inedible slaughterhouse materials comprising reducing substantially all solid portions including bones of said materials, introducing vascular portions of said materials to said reduced portions, heating the mixture thus formed to denaturize said vascular portions and to lower the moisture content of said mixture, reducing further said solid portions in said mixture to a predetermined particle size, heating the mixture to rupture the fat cells, to further reduce the moisture content, and to render the materials substantially free from deleterious agents, centrifugally separating and recovering the solid and liquid phases of said mixture, and removing residual liquid phase materials from the solid phase.

4. A continuous process for obtaining fats, and meat and bone scrap from inedible slaughterhouse materials comprising reducing substantially all solid portions including bones of said materials, introducing partially denaturized vascular portions of said materials to said reduced portions, heating the mixture thus formed to a temperature of from about 100° to about 212° F. to further denaturize said vascular portions and to lower the moisture content of said mixture, reducing further said solid portions in said mixture to a predetermined particle size, heating the mixture at a temperature of from about 220° to about 270° F. to rupture the fat cells, to further reduce the moisture content, and to render the materials substantially free from deleterious agents, and centrifugally separating and recovering the solid and liquid phases of said mixture.

References Cited in the file of this patent

UNITED STATES PATENTS

| | | |
|---|---|---|
| 2,616,910 | Pavia | Nov. 4, 1952 |
| 2,745,856 | Dayen et al. | May 15, 1956 |
| 2,875,222 | Dormitzer | Feb. 24, 1959 |